(12) United States Patent
Rybkiewicz

(10) Patent No.: US 9,800,084 B2
(45) Date of Patent: Oct. 24, 2017

(54) SOLAR POWERED CASE FOR CHARGING ELECTRONIC DEVICES

(71) Applicant: Joachim Rybkiewicz, Staten Island, NY (US)

(72) Inventor: Joachim Rybkiewicz, Staten Island, NY (US)

(*) Notice: Subject to any disclaimer, the term of this patent is extended or adjusted under 35 U.S.C. 154(b) by 3 days.

(21) Appl. No.: 14/632,853

(22) Filed: Feb. 26, 2015

(65) Prior Publication Data

US 2015/0256026 A1    Sep. 10, 2015

Related U.S. Application Data

(60) Provisional application No. 61/950,290, filed on Mar. 10, 2014.

(51) Int. Cl.
*H02J 7/00* (2006.01)
*H02J 7/35* (2006.01)

(52) U.S. Cl.
CPC ........... *H02J 7/35* (2013.01); *H02J 7/0044* (2013.01)

(58) Field of Classification Search
CPC .................. H02J 7/0044; H02J 7/35
USPC ........................ 320/101, 114, 137
See application file for complete search history.

(56) References Cited

U.S. PATENT DOCUMENTS

| | | |
|---|---|---|
| 2005/0219839 A1 | 10/2005 | Branson |
| 2006/0273757 A1 | 12/2006 | Naguib |
| 2011/0039605 A1* | 2/2011 | Choi ............... H02J 7/0047 455/573 |
| 2012/0042996 A1 | 2/2012 | Glynn |
| 2012/0299528 A1 | 11/2012 | Scarmozzino |
| 2012/0306431 A1 | 12/2012 | Li et al. |
| 2014/0168866 A1* | 6/2014 | Armstrong ......... H05K 5/0021 361/679.01 |

* cited by examiner

*Primary Examiner* — Edward Tso
*Assistant Examiner* — Aaron Piggush
(74) *Attorney, Agent, or Firm* — Global Intellectual Property Agency, LLC; Jordan Sworen

(57) ABSTRACT

A solar powered case for charging electronic devices is provided. The solar powered case includes a housing having a body, a back panel and a front panel. The back panel and the front panel include apertures that define interactive members of an electronic device. Solar panels are incorporated into the body of the housing. A circuit board is coupled to the solar panel. The circuit board is incorporated into the body of the housing and is integrally attached to the solar panel. An output jack extending from the circuit board is removably attached to the electronic device. A Meter Light is disposed on the surface of the housing. The Meter Light indicates the strength of a light source used to power the solar panels.

8 Claims, 3 Drawing Sheets

SOLAR POWERED CASE FOR CHARGING ELECTRONIC DEVICES

CROSS REFERENCE TO RELATED APPLICATION

This application claims the benefit of U.S. Provisional Application No. 61/950,290 filed on Mar. 10, 2014, entitled "Solar Smart Phone and Tablet Case." The above identified patent application is herein incorporated by reference in its entirety to provide continuity of disclosure.

FIELD OF THE INVENTION

The present invention relates to solar chargers and cases for portable electronic devices. More particularly, the present invention relates to a solar panel integrated within a case for charging portable electronic devices without the need of separate equipment.

BACKGROUND OF THE INVENTION

Cell phones have become an indispensable part of many people's daily lives. People rely on their cell phones for a variety of purposes, including communicating with friends and family, managing email accounts, banking, social networking and scheduling/planning daily activities. Given the importance of cell phones to modern life, it is essential that cell phones are operating at maximum efficiency and have a charged battery at all times.

Unfortunately, cell phone batteries often need to be recharged at the end of the day, and depending upon the frequency of use, the cell phone battery may not last throughout the day. Cell phone battery technology is limited, particularly because of the design and size restraints required for modern day cellphones. Due to these restraints, a cell phone battery may not provide adequate battery life for a device. Additionally, over the life of a cell phone or tablet, the battery life diminishes in its capacity to hold charge, leading to charging the battery more frequently. Many cell phone users have also resorted to buying spare batteries, buying new phones, or carrying bulky chargers which can be both expensive and cumbersome. Thus, many people must travel with battery chargers, which can easily be lost or forgotten.

Solar cell systems for charging the batteries of electronic devices such as mobile phones, tablets, music devices, and laptops and many other related battery charging products are typically provided as separate units that connect to the battery powered device by means of a cable or adapter. The solar charger is therefore a separate item to the portable device. Some solar cell systems integrate or attach solar charging cells to a dock or holster into which the device can be placed. Once the device is within the dock/holster an electrical connection is made between the device and the case so as to charge the internal battery. However, these configurations usually prevent the portable device from being used in the conventional manner as intended by the device manufacturer. Current solar chargers are known to be bulky and render the device less portable. These configurations also require action on the user's part to begin charging, either by activating the charger or plugging the charger into the device.

It would therefore be useful to provide a solar powered case configured in such a way that it would not have to be considered as a separate item and it would not add significant size or weight to the portable device. The proposed invention would allow the portable device to be charged without the user having to consider commencing the charging and without having to carry extra equipment together with the device. It would also allow the portable device's battery to be charged even while the device is being operated by the user. Additionally, the proposed invention would indicate the strength of a light source used to power the solar panels, thus allowing users to find an adequate light source for keeping the battery charged.

SUMMARY OF THE INVENTION

In view of the foregoing disadvantages inherent in the known types of solar powered charging devices now present in the prior art, the present invention provides a solar powered case wherein the same can be utilized for providing convenience for the user when a handheld or mobile device needs an efficient and less cumbersome way to charge batteries.

It is therefore an object of the present invention to provide a new and improved solar powered case for charging portable electronic devices that has all of the advantages of the prior art and none of the disadvantages.

According to one embodiment of the present invention, a solar powered case for charging portable electronic devices is provided. The case comprises a housing, solar panels, a circuit board, an output jack and a Meter Light. The housing comprises a body, a back panel and a front panel. The back panel and the front panel form apertures that define interactive members of an electronic device. The housing further comprises at least one solar panel incorporated into the body of the housing. A circuit board is integrally attached to the solar panel. An output jack extends from the circuit board of the solar panel to the electronic device. The output jack is removably attached to the electronic device. Further, a Meter Light may be disposed on a surface of the housing. The Meter Light indicates the strength of a light source used to power the solar panels.

It is another object of the present invention to provide a solar powered case further comprising electrical plugs within the housing to connect the circuit board of the housing with the electronic device.

Yet another object of the present invention is to provide a solar powered case having solar panels capable of producing electricity from radiant light sources.

Still yet another object of the present invention is to provide a solar powered case wherein the output jack includes a plug adapted for insertion into a portable electronic device charging port.

Yet is another object of the present invention is to provide a solar powered case wherein the housing is configured to receive a smart phone or a tablet.

Still yet another object of the present invention is to provide a solar powered case wherein the back panel comprises a plurality of solar panels.

It is another object of the present invention to provide a solar powered case wherein solar panels and a Meter Light are electrically connected by means of circuitry disposed within the housing.

It is another object of the present invention to provide a solar powered case having a Meter Light that indicates the strength of the light source on the electronic device interface.

Another object of the present invention is to provide a solar powered case wherein the housing is configured to allow a user to plug the electronic device to a conventional charger.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
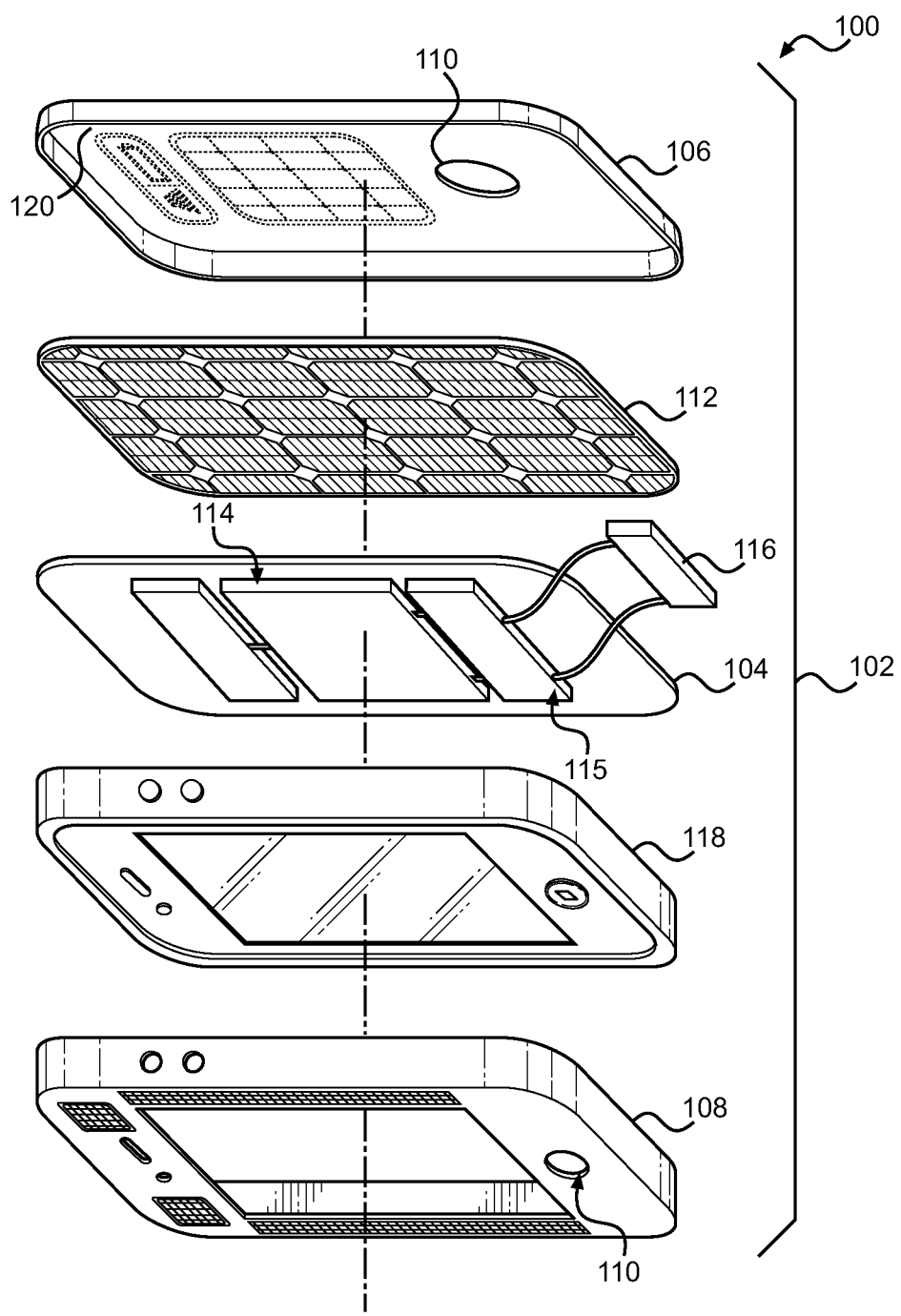
FIG. 1 shows an exploded view of the solar powered case coupled to an electronic device according to one embodiment of the present invention.

Reference is made herein to the attached drawings. Like reference numerals are used throughout the drawings to depict like or similar elements of the solar powered case. For the purposes of presenting a brief and clear description of the present invention, the preferred embodiment will be discussed as used for holding and charging smart phones and tablets. The figures are intended for representative purposes only and should not be considered to be limiting in any respect.

Referring now to FIG. 1, there is shown an exploded view of the solar powered case 100 for charging electronic devices. The solar powered case comprises a housing 102, a solar panel 112, a circuit board 114, an output jack 116, and a Meter Light 120. The housing 102 may include a body 104, a back panel 106 and a front panel 108. The back panel 106 and the front panel 108 each include one or more apertures 110 therethrough that define interactive members of an electronic device 118. For example, the front panel 108 may have apertures for a cellphone interface, a speaker, a camera, and other externally-disposed components of a conventional mobile electronic device. Similarly, the back panel 106 may have apertures defining a camera, a flash device, etc.

The housing body 104, front panel 108 and back panel 106 may be configured to fit a variety of different electronic devices 118. The housing 102 is adapted to receive an electronic device and lock over or around the outer body of the electronic device 118. The housing is fabricated from a material comprising a lightweight, durable material, such as rubber or hard plastic. Alternatively, the housing 102 can be fabricated from a material comprising alumia, nickel, zinc, copper, lead or other pliable metals and alloys.

A solar panel 112 is disposed on the outer periphery of the housing 102. The solar panels 112 are exposed on the outer surface of the cell phone case, but still within the body 104 of the housing 102, therefore allowing a compact design. The solar panel 112 comprises a single or multiple solar cells integrated into the body 104 of the housing 102, and each solar panel includes various regulator chips and resistors to achieve a specific electrical output dependent upon the requirements of the electronic device. When the solar panel 112 is energized by a light source, the solar cells disposed thereon produce energy and charge the internal battery 115 of the case 100. When the battery level of the portable electronic device 118 to which the case 100 is affixed is not at full capacity, the internal battery 115 then charges the integral battery of the portable electronic device.

A circuit board 114 is coupled to the housing 102. The circuit board 114 is incorporated into the body 104 of the housing 102 and integrally attached to the solar panel 112. The circuit 114 may be connected to the portable electronic device through the use of electrical contacts, which will enable the energy produced by the solar cell or cells to charge the battery of the portable electronic device 118. The housing 102 may include built-in electrical connectors that act as contacts allowing the energy producing circuitry of the case to be connected to the charging circuitry of the portable device. The solar panel 112 and the circuit board 114 are integrally attached by electrical connectors to receive electrical power converted from solar energy by the solar panels 112. The solar energy is then converted to electrical energy and stored in an internal battery 115 on the circuit board 114.

The internal battery 115 stores energy converted from solar energy to electrical energy. The internal battery 115 is in the body of the housing 102 and is electrically connectable to the solar panel 112. The converted solar power energy can be used to charge a cellular phone battery or a tablet battery. The internal battery 115 comprises a series of rechargeable batteries within the housing 102 that are coupled together in series to deliver as much potential to the electronic device.

The housing may further comprise an output jack 116 extending from the internal battery 115 to the electronic device. The output jack 116 is adapted to be inserted into the charging port of an electronic device 118. The output jack 116 transfers the converted solar power energy from the internal battery 115 of housing to the electronic. The output jack 116 directs the solar power energy from the internal battery 115 in the housing 102 to the connected to the electronic device, either to be directly consumed by the electronic device or to be used to charge the battery in the electronic device.

Figure 2:
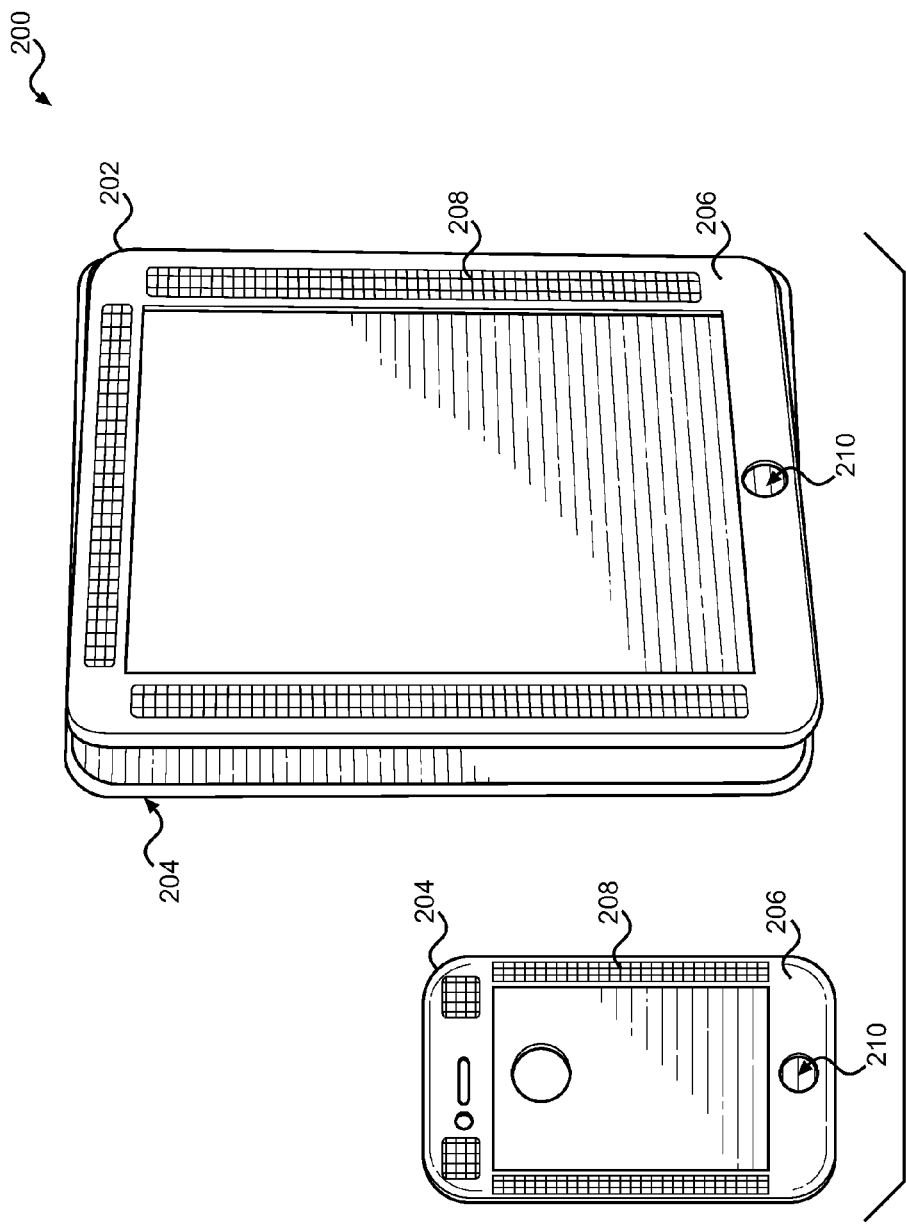
FIG. 2 shows a front perspective view of the solar powered case for different electronic devices according to one embodiment of the present invention.

Referring now to FIG. 2, there is shown a frontal view of the solar powered case for different electronic devices according to one embodiment of the present invention. The housing 200 includes a body 202, a back panel 204 and a front panel 206. One or more solar panels 208 are disposed on the outer surface of the front panel 206, allowing the electronic device to be charged while in use by a user or when placed in face up direction. The solar panels 28 are preferably positioned on the periphery of the front panel 206. This configuration allows a user to use the portable electronic device while simultaneously charging the device. The front panel 206 includes one or more apertures 210 on the housing 200 that provide users access to the interactive components of an electronic device, such as a touch screen, a microphone, camera, etc. In the illustrated embodiment, the front panel 206 includes a central, rectangular opening adapted to provide access to the touch screen of the electronic device, and further includes a circular opening on the lower end thereof for providing access to a power button of the electronic device. The front panel 206 is preferably composed of hard plastic, rubber, or more preferably, a shell with an inner rubber portion and an outer hard plastic portion.

Figure 3:
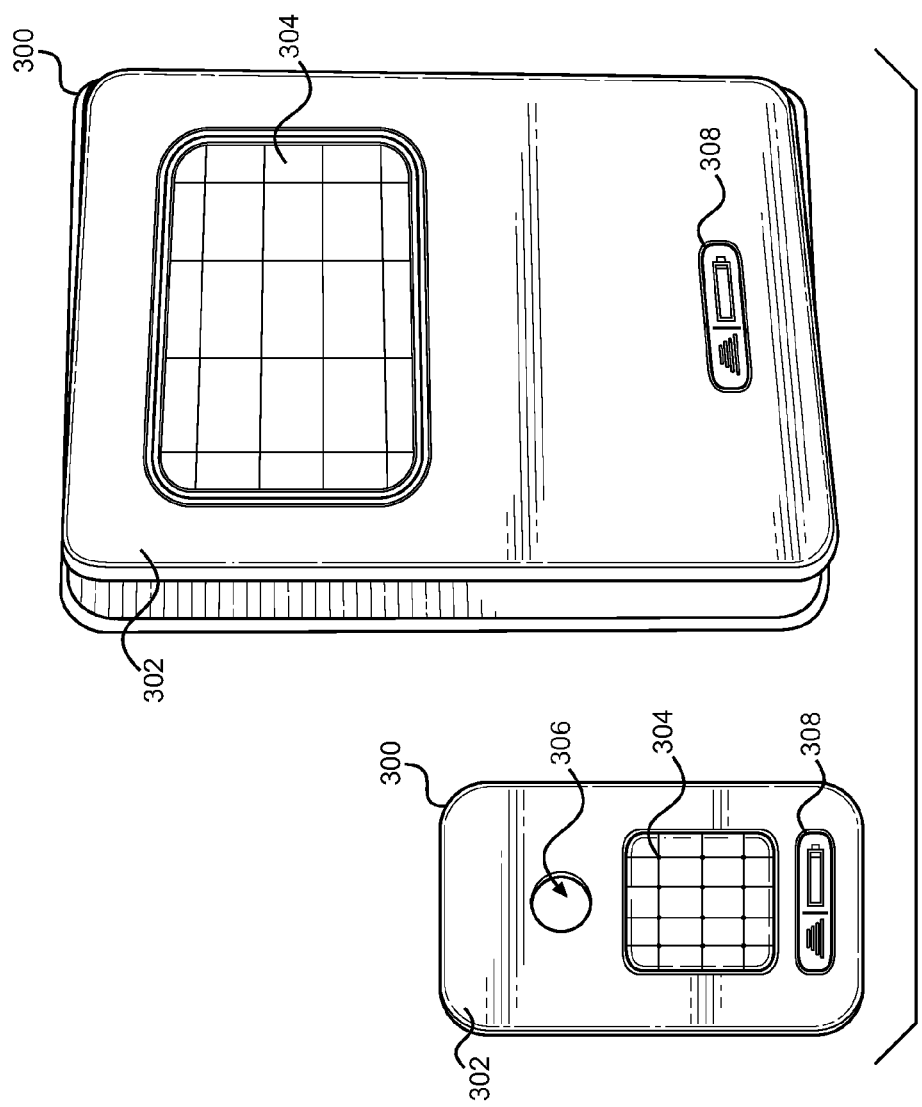
FIG. 3 shows a rear perspective view of the solar powered case for different electronic devices according to one embodiment of the present invention.

Referring now to FIG. 3, there is shown a rear view of the solar powered case in different configurations according to one embodiment of the present invention. The back panel 302 of the housing 300 includes one or more solar panels 304, apertures 306 that define interactive members of the electronic device, and a Meter Light 308. This configuration for the back panel 302 is ideal when the electronic device is placed on a flat surface and not in use. Additional solar panels 304 be placed on the back panel 302, therefore allowing more efficient charging.

A Meter Light 308 is disposed on a surface of the back panel 302 of the housing 300. The Meter Light 308 provides means for determining the strength of the light source used to power the solar panels 304 and includes a display for indicating the strength of the light source. The Meter Light 30 is electrically connected to the circuit board of the solar powered case. Although the present embodiment shows the Meter Light 308 on the back panel 302 of the housing 300, it can also be on the front panel, side panels or displayed on the electronic device screen. The Meter Light 308 can display the strength of the light source, as well as the electronic device's battery power. The back panel 302 is fabricated from a material comprising hard plastic, rubber, or more preferably, a shell with an inner rubber portion and an outer hard plastic portion.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar powered case for charging a portable electronic device, comprising:
    a housing comprising a body, a back panel and a front panel, the back panel and the front panel comprising apertures that expose one or more interactive members of the portable electronic device;
    at least one solar panel incorporated into the body of the housing between the front panel and the back panel, wherein the apertures in the front panel and the back panel expose the at least one solar panel;
    a circuit board electrically connected to the at least one solar panel, wherein the circuit board is incorporated into the body of the housing;
    an internal battery electrically coupled to the circuit board, wherein solar energy is absorbed by the at least one solar panel, the at least one solar panel converts the solar energy to electrical energy, and the electrical energy is communicated to the internal battery;
    an output jack in electrical communication with the internal battery and removably connectable to the electronic device; and
    a meter light disposed on a surface of the housing, the meter light indicating a strength of a light source emitting the solar energy absorbed by the at least one solar cell.

2. The solar powered case of claim 1, wherein the output jack electrically connects the internal battery of the housing with the electronic device.

3. The solar powered case of claim 1, wherein the at least one solar panel comprises a photovoltaic cell.

4. The solar powered case of claim 1, wherein the circuit board comprises an electrical plug operably connectable to an input jack of the portable electronic device.

5. The solar powered case of claim 1, wherein the housing is configured to receive the portable electronic device.

6. The solar powered case of claim 1, wherein the back panel comprises at least one solar panel.

7. The solar powered case of claim 1, wherein the solar panels and meter light are electrically connected by means of circuitry disposed within the housing.

8. The solar powered case of claim 1, wherein the housing is configured to allow a user to plug the electronic device to a conventional charger via the output jack.

* * * * *